United States Patent
Mochizuki et al.

(10) Patent No.: US 10,327,102 B2
(45) Date of Patent: *Jun. 18, 2019

(54) MOBILE DEVICE PROXIMITY NOTIFICATION

(71) Applicant: International Business Machines Corporation, Armonk, NY (US)

(72) Inventors: Tomoka Mochizuki, Tokyo (JP); Tomohiro Shioya, Tokyo (JP); Asuka Unno, Tokyo (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 500 days.

This patent is subject to a terminal disclaimer.

(21) Appl. No.: 15/146,930

(22) Filed: May 5, 2016

(65) Prior Publication Data

US 2016/0360363 A1  Dec. 8, 2016

Related U.S. Application Data

(63) Continuation of application No. 14/731,590, filed on Jun. 5, 2015, now Pat. No. 9,998,868.

(51) Int. Cl.
*H04W 4/02* (2018.01)
*G01S 5/02* (2010.01)
(Continued)

(52) U.S. Cl.
CPC ........... *H04W 4/023* (2013.01); *G01S 5/0027* (2013.01); *G01S 5/0226* (2013.01); *G01S 5/0289* (2013.01);
(Continued)

(58) Field of Classification Search
CPC ..... H04W 4/023; H04W 4/022; H04W 4/027; H04W 4/08; H04W 24/08; H04W 64/00;
(Continued)

(56) References Cited

U.S. PATENT DOCUMENTS 7,657,256 B2  2/2010  Bates et al.
7,668,537 B2  2/2010  De Vries
(Continued)

FOREIGN PATENT DOCUMENTS

| JP | 2004312694 A | 11/2004 |
| JP | 2011217128 A | 10/2011 |
| JP | 2014119889 A | 6/2014 |

OTHER PUBLICATIONS

Amir, et al., "Buddy tracking—efficient proximity detection among mobile friends", Pervasive and Mobile Computing, vol. 3, Issue 5, Oct. 2007, pp. 489-511, <http://www.sciencedirect.com/science/article/pii/S1574119207000028>.

(Continued)

*Primary Examiner* — Harry K Liu
(74) *Attorney, Agent, or Firm* — Daniel R. Simek

(57) ABSTRACT

Aspects of the present invention disclose a method, computer program product, and system for mobile computing device proximity notification. The method includes one or more processors acquiring location information for a plurality of mobile computing devices. The method further includes one or more processors creating a first group of mobile computing devices based on location proximity in the acquired location information of the plurality of mobile computing devices, wherein the created first group includes a first mobile computing device and a second mobile computing device. The method further includes one or more processors determining whether the first mobile computing device is within a predetermined distance to the second mobile computing device, and the first mobile computing device and the second mobile computing device are outside of an area associated with the first group.

6 Claims, 10 Drawing Sheets

(51) Int. Cl.
*G01S 5/00* (2006.01)
*H04W 4/021* (2018.01)
*H04L 29/08* (2006.01)
*H04W 24/08* (2009.01)
*H04W 68/00* (2009.01)
*H04W 4/08* (2009.01)
*H04W 64/00* (2009.01)

(52) U.S. Cl.
CPC ........... *H04L 67/306* (2013.01); *H04W 4/022* (2013.01); *H04W 4/027* (2013.01); *H04W 4/08* (2013.01); *H04W 24/08* (2013.01); *H04W 64/00* (2013.01); *H04W 68/005* (2013.01); *H04W 4/021* (2013.01)

(58) Field of Classification Search
CPC .. H04W 68/005; H04L 67/306; G01S 5/0027; G01S 5/0226; G01S 5/0289
USPC ........................................................ 342/451
See application file for complete search history.

(56) References Cited

U.S. PATENT DOCUMENTS

| | | | |
|---|---|---|---|
| 8,447,516 | B1 | 5/2013 | Koulomzin et al. |
| 8,730,872 | B2 | 5/2014 | Eimaieh |
| 2008/0285542 | A1 | 11/2008 | Jachner |
| 2012/0195295 | A1 | 8/2012 | Elmaleh |
| 2013/0005362 | A1 | 1/2013 | Borghei |
| 2013/0191198 | A1 | 7/2013 | Carlson et al. |
| 2014/0113674 | A1 | 4/2014 | Joseph et al. |
| 2015/0063095 | A1* | 3/2015 | Deng ................ H04W 76/18 370/221 |
| 2016/0239139 | A1 | 8/2016 | Wang et al. |

OTHER PUBLICATIONS

Lubke, et al., "MobilisGroups: Location-based Group Formation in Mobile Social Networks", IEEE Second Workshop on Pervasive Collaboration and Social Networking, Mar. 21-25, 2011, pp. 502-507, <http://ieeexplore.ieee.org/xpl/articleDetails.jsp?tp=&amumber=5766941&url=http%3A%2F%2Fieeexplore.ieee.org%wFxpls%2Fabs_all.jsp%3Farnumber%3D5766941>.

Hiruta, "GLoBES: A Spatio-Temporal Grouping Algorithm using Micro-Blog Entries", Abstract of Bachelor's Thesis, Academic Year 2010, 1 page, <http://www.sfc.wide.ad.jp/thesis/2010/files/hiru-publish-thesis.pdf>.

List of IBM Patents or Patent Applications Treated as Related, Appendix P, Filed Herewith.

Mochizuki, et al., U.S. Appl. No. 14/731,590, filed Jun. 5, 2015, (a copy is not provided as this application is available to the Examiner).

* cited by examiner

| Mobile device ID | Time | Location information |
|---|---|---|
| cxresigxg..feg | 11/6/2014 9:00 | 35.65858 139.745433 |
| cxresigxg..feg | 11/6/2014 9:10 | 35.65858 139.745433 |
| cxresigxg..feg | . . . | . . . |

FIG. 3

| Mobile device ID | Location information | IDs of mobile devices having appeared in the vicinity (count of appearances) |
|---|---|---|
| cxresigxg..feg | 35.658858,139.745433 ~ 35.65860,139.745435 | efexfs..cgf(2),fger..fee(3),qegfe...get(1),onbf..plf(5),ouitf..a t(1),... |
| cxresigxg..feg | 35.658809,139.70988 ~ 35.658789,139.74978 | gigxg..eaf(3),tdrs..ete(2),hzahr..lkj(5),qpaf..hjs( 1),... |
| ... | ... | ... |
| rsdfesfei..qvx | 35.658704,139.745408 ~ 35.658705,139.745409 | ligrg..eff(6),twst..ere(8),hzagr..lkj(3),qpof..hjs(3),... |
| rsdfesfei..qvx | 35.658788,139.798237 ~ 35.658989,139.745909 | Lyugag..eaf(3),tafet..es(6),haagr..lkj(7),qafof..hjs(1),... |
| ... | ... | ... |

FIG. 4

| Mobile device ID | Location information | IDs of mobile devices having appeared in the vicinity (count of appearances) |
|---|---|---|
| cxresigxg..feg | 35.65858,139.745433 ~ 35.65860,139.745435 | efexfs..cgf(23.67),fger..fee(33.52),qegfe..get(58.78),onbf..plf(5.33), ouitf..a t(1.62),... |
| cxresigxg..feg | 35.658809,139.70988 ~ 35.658789,139.74978 | gigxg..eaf(32.44),tdrs..ete(2.22),hzahr..lkj(41.27),qpaf..hjs(7.91),... |
| ... | ... | ... |
| rsdfesfei..qvx | 35.658704,139.745408 ~ 35.658705,139.745409 | ligrg..eff(33.56),twst..ere(26.98),hzagr..lkj(15.37),qpof..hjs(18.52),... |
| ... | ... | ... |

FIG. 5

MOBILE DEVICE PROXIMITY NOTIFICATION

BACKGROUND OF THE INVENTION

The present invention relates generally to the field of mobile devices, and more particularly to providing notification of proximity of a mobile device.

A mobile device is a computing device that is typically small enough to be handheld (e.g., a handheld computer, a smartphone, etc.). Mobile devices can include displays that are capable of receiving touch input. A mobile computing device has an operating system (OS) and can run various types of application software, known as apps. Many mobile computing devices are capable of communicating over a wireless network and can include near-field communication (NFC) and global positioning system (GPS) communication capabilities. These capabilities can allow connections to the Internet and other devices, such as an automobile or a microphone headset or can be used to provide location-based services. A camera or media player feature for video or music files can also be typically found on mobile computing devices, along with a battery power source. Increasingly, mobile computing devices also contain sensors like accelerometers, compasses, magnetometers, and/or gyroscopes, allowing detection of orientation and motion.

Location-based services (LBS) are a general class of computer program-level services that use location data to control features. As such, LBS is an information service and has a number of uses in social networking today as an entertainment service, which is accessible with mobile devices through the mobile network and which uses information on the geographical position of the mobile device. LBS are used in a variety of contexts, such as health, indoor object search, entertainment, work, personal life, etc. LBS include services to identify a location of a person or object, such as discovering the nearest banking cash machine or the whereabouts of a friend or employee. LBS include parcel tracking and vehicle tracking services.

SUMMARY

Aspects of the present invention disclose a method, computer program product, and system for mobile computing device proximity notification. The method includes one or more processors acquiring location information for a plurality of mobile computing devices. The method further includes one or more processors creating a first group of mobile computing devices based on location proximity in the acquired location information of the plurality of mobile computing devices, wherein the created first group includes a first mobile computing device and a second mobile computing device. The method further includes one or more processors determining whether the first mobile computing device is within a predetermined distance to the second mobile computing device, and the first mobile computing device and the second mobile computing device are outside of an area associated with the first group.

BRIEF DESCRIPTION OF THE DRAWINGS

FIG. 3 shows exemplary location information, according to an embodiment of the present invention.

FIG. 4 shows an example of information defining the areas where each mobile device spends time, according to an embodiment of the present invention.

FIG. 5 shows exemplary updated groups or group candidates resulting from a weighting unit, according to an embodiment of the present invention.

DETAILED DESCRIPTION

Some embodiments of the present invention recognize that people often associate with others in groups. Whether a person is at work, the gym, a client's office, or some other regularly visited place, the people who are around the person in each of the places are likely to be mostly the same groupings of people from one day to another. Occasionally, someone from one of the person's regularly visited places will happen to go to the same place as the person outside of the regularly visited place. In some cases, the person will want to know this fact so that they can act accordingly.

Implementation of embodiments of the invention may take a variety of forms, and exemplary implementation details are discussed subsequently with reference to the Figures. Hereinafter, example embodiments of the present invention will be described. The example embodiments shall not limit the claims, and the combinations of features described in the embodiments are not necessarily essential to the invention.

Figure 1:
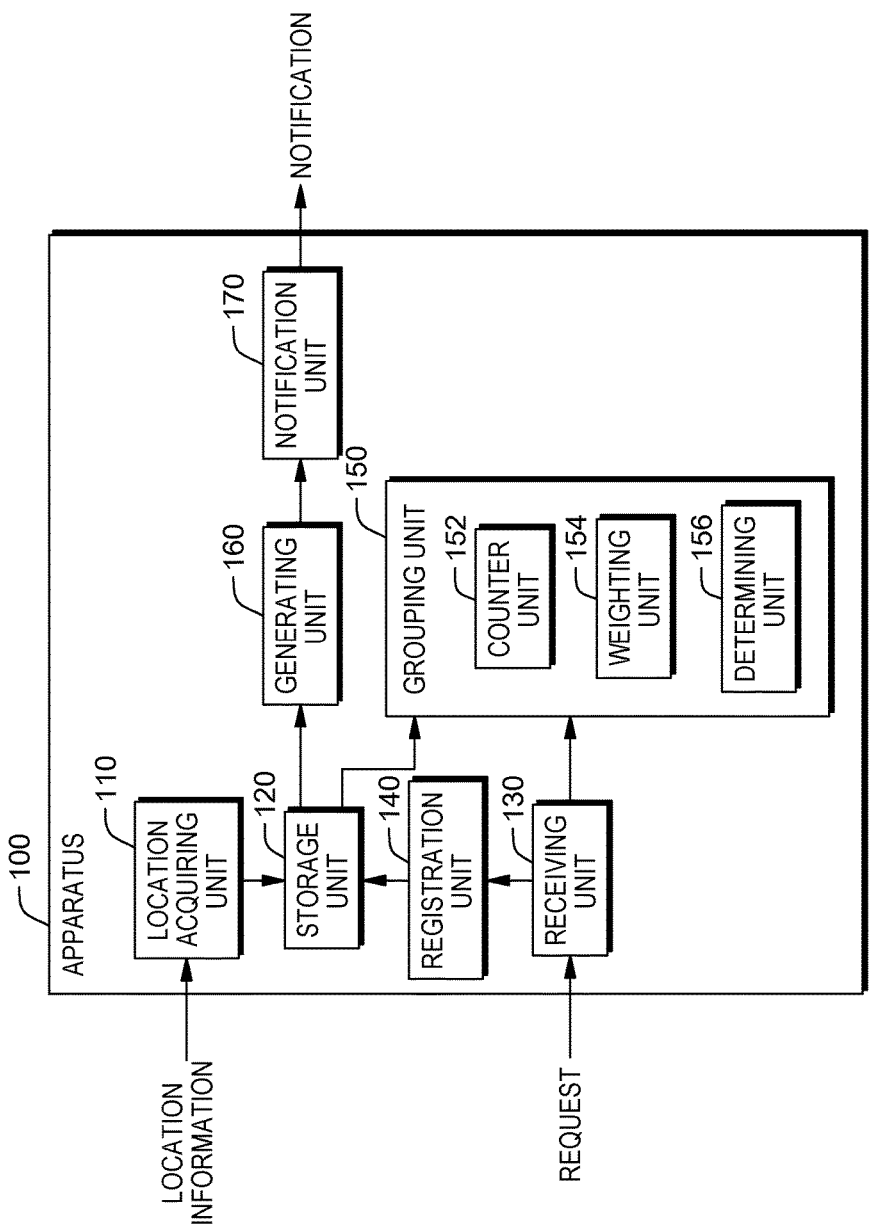
FIG. 1 shows an exemplary configuration of an apparatus, according to an embodiment of the present invention.

FIG. 1 shows an exemplary configuration of an apparatus 100, according to an embodiment of the present invention. The apparatus 100 automatically and dynamically groups mobile devices that are present in an area around a mobile device of the user, according to daily activities of a user, and provides notification when a mobile device in one group is near the mobile device of the user at a location differing from the group location. The apparatus 100, which may be realized in a server, may periodically acquire location information of a plurality of mobile devices, group the mobile devices based on the location information, and, in response to discovering that mobile devices in one of the groups have become proximal at a location that is not associated with that group, deliver a notification to these proximal mobile devices.

In other embodiments, the apparatus 100 may be realized on a mobile device. The server may reside on a network, such as the Internet, a subscriber network, a cellular network, or any combination of networks. The server may be a dedicated server or a shared server performing other operations. The server may reside at any point on a network and may be in communication with the mobile devices through access points, gateways, other servers, etc., in any combination of wireless and wired communication paths. In embodiments where the apparatus 100 is realized on a mobile device, the apparatus 100 may only operate with respect to groups with which the mobile device associates.

A mobile device may be any device that has a communication function, such as a mobile telephone, a smart phone, a tablet PC, a wearable PC, a game device, a miniature computer, etc. The apparatus 100 includes a location acquiring unit 110, a storage unit 120, a receiving unit 130, a registration unit 140, a grouping unit 150, a generating unit 160, and a notification unit 170.

The location acquiring unit 110 may be operable to periodically acquire the location information of mobile devices within a network (e.g., each mobile device in an entire network), on the Internet, subscribing to a service provider, subscribing to a proximity service, etc. The location acquiring unit 110 may acquire the location information of each mobile device at a time interval, such as a second, a minute, an hour, a day, a week, a month, a year, or any multiple thereof. The actual times that the location information is acquired may be offset among the mobile devices, which may avoid network congestion. The location information may indicate a relative or an absolute location of a mobile device. For example, the location acquiring unit 110 may acquire the location information that has been acquired by a mobile device using GPS, a geomagnetic sensor, etc., or location information from the current access point, such as a wireless hotspot of known location, a cellular antenna tower of known location, etc. Alternatively, the mobile device may upload the devices location to the location acquiring unit 110. The location acquiring unit 110 may acquire the location information from each of the plurality of mobile devices through wireless communication, wired communication, or a combination of wired and wireless communication protocols interconnected in a network, such as the Internet. The location acquiring unit 110 can be a modem, a LAN interface, a wireless LAN interface, or any other wired or wireless communication interface.

The location information may include longitude and latitude in an absolute coordinate system, distance and direction from a reference point, etc. The location information may include height information, such as altitude. The location acquiring unit 110 may acquire the height information detected by a mobile device using an atmospheric pressure sensor or other type of altimeter. The apparatus 100 may acquire the location information from mobile devices that have previously permitted the use of their location information.

The storage unit 120 is in communication with the location acquiring unit 110 and may be operable to store the acquired location information. The storage unit 120 may store a time that the location information was acquired and identification of the mobile device, along with the location information. The storage unit 120 may store setting values of the apparatus 100, intermediate data, calculation results, thresholds, parameters, and the like that are generated or used in the operations performed by the apparatus 100. In response to a request from a component in the apparatus 100, the storage unit 120 may supply the stored data to the component. The storage unit 120 may be a computer readable medium, such as an electronic storage device, a magnetic storage device, an optical storage device, an electromagnetic storage device, a semiconductor storage device, etc.

The receiving unit 130 may be operable to receive a request from each mobile device. The receiving unit 130 may receive a request to set or change the setting values, thresholds, parameters, and the like of the apparatus 100. The receiving unit 130 may receive a request to manipulate the operation of a mobile device. The receiving unit 130 may receive each request via wireless communication, wired communication, or a combination of wired and wireless communication protocols interconnected in a network, such as the Internet. The receiving unit 130 may supply the received request to the registration unit 140 and/or the grouping unit 150. The receiving unit 130 can be a modem, a LAN interface, a wireless LAN interface, or any other wired or wireless communication interface. In some embodiments, the location acquiring unit and the receiving unit may be the same unit.

The registration unit 140 may be operable to register the setting values, thresholds, parameters, and the like of the apparatus 100 in the storage unit 120 in response to requests from mobile devices. The registration unit 140 is in communication with the receiving unit 130 to receive a request from a mobile device. Furthermore, the registration unit 140 is in communication with the storage unit 120 to register setting values and the like corresponding to or included in a request from a mobile device in the storage unit 120. The registration unit 140 may be a circuit, a shared or dedicated computer readable medium storing computer readable program instructions executed by a shared or dedicated processor, etc.

The grouping unit 150 may be operable to create a group by grouping at least two of the plurality of mobile devices based on proximity by using the location information of each mobile device. For example, the grouping unit 150 may create a first group based on a degree of proximity (e.g., distance) of each mobile device to a first mobile device of the plurality of mobile devices.

The grouping unit 150 may create the first group based on a number of detections of each mobile device within the degree of proximity to the first mobile device. The grouping unit 150 may define an area, such as a geographic area, by the degree of proximity to the first mobile device. For example, if the first mobile device is detected to remain within certain bounds despite smaller movements within those bounds, then the grouping unit 150 may define the area according to those bounds. The grouping unit 150 may create the first group based on the number of detections of each mobile device within the degree of proximity to the first mobile device within a time period that the first mobile device is present within an area. The first group generated by the grouping unit 150 may correspond to the area.

The grouping unit 150 is in communication with the storage unit 120. The grouping unit 150 may read the location information of the plurality of mobile devices and generate at least one group based on this location information. The grouping unit 150 may store the generated group information in the storage unit 120. The grouping unit 150 may read the location information of the plurality of mobile devices and the group information stored in the storage unit 120 and update the group information based on the location information. The grouping unit 150 may include a counter unit 152, a weighting unit 154, and a determining unit 156. The grouping unit 150 may be a circuit, a shared or dedicated computer readable medium storing computer readable program instructions executed by a shared or dedicated processor, etc. In some embodiments, the grouping unit 150 may be computer readable instructions stored on the same computer readable medium and executed by the same processor as the registration unit 140.

The counter unit 152 may be operable to count a number of detections of a second mobile device among the plurality of mobile devices in the area where the first mobile device is located during the time period using the location information of the first and second mobile devices in the storage unit 120. The time period may be a minute, an hour, a day, a week, a month, a year, a decade, or any multiple thereof. This time period may be set by the user, such as by inputting the time period into the user's mobile device. The area where the first mobile device is located may be a geographical area, such as an area of an office, a gym, a park, an arena, etc. Alternatively, this area may be an area that moves in accordance with movement of the first mobile device, such as an area of an automobile, a train, an airplane, a boat, or any other vessel. This area may be an area defined by a degree of proximity to the first mobile device. In other embodiments, the area may be a known location of an office, a gym, a park, an arena, etc., defined by a set of geographic coordinates, such as a geofence.

For example, in response to one or more mobile devices being detected within the predetermined distance from the first mobile device within the time period, the counter unit 152 counts the number of detections of each of the mobile devices. The counter unit 152 may store the number of detections of each of the mobile devices in the storage unit 120. The counter unit 152 may be a circuit, a shared or dedicated computer readable medium storing computer readable program instructions executed by a shared or dedicated processor, etc. In some embodiments, the counter unit may be computer readable instructions stored on the same computer readable medium and executed by the same processor as the registration unit and/or the grouping unit.

The weighting unit 154 may be operable to assign a weight to each detection of the number of detections by assigning less weight to older detections. The weighting unit 154 may assign a smaller weight that causes an older detection of a mobile device to not affect, or impact less, the group creation performed by the grouping unit 150. For example, the weighting unit 154 may multiply each detection occurring within a time period by a coefficient corresponding to this smaller weight. The weighting unit 154 may assign each detection a value of 1, then multiply each detection from more than one month ago by 0.8. In other embodiments, the weighting unit may subtract, from each detection, a coefficient multiplied by its age in hours, days, weeks, months, years, or any other applicable unit of time. The coefficient may be adjusted according to the applicable unit of time. The weighting unit 154 may store the weighted number of detections in the storage unit 120. Coefficients and/or formulas corresponding to the weighting algorithm may be stored in the storage unit 120. The weighting unit 154 may be a circuit, a shared or dedicated computer readable medium storing computer readable program instructions executed by a shared or dedicated processor, etc. In some embodiments, the weighting unit may be computer readable instructions stored on the same computer readable medium and executed by the same processor as the registration unit, the grouping unit, and/or the counter unit.

The determining unit 156 may be operable to determine whether to add the second mobile device to the first group by comparing the number of detections to a predetermined threshold. If the weighting unit 154 has weighted the detections, then the determining unit 156 may determine whether to add the second mobile device to the first group by comparing the weighted number of detections to the predetermined threshold. If the second mobile device is added to the first group, then the determining unit 156 may store information concerning the updated first group in the storage unit 120. The determining unit 156 may be a circuit, a shared or dedicated computer readable medium storing computer readable program instructions executed by a shared or dedicated processor, etc. In some embodiments, the determining unit may be computer readable instructions stored on the same computer readable medium and executed by the same processor as the registration unit, the grouping unit, the counter unit, and/or the weighting unit.

The generating unit 160 may be operable to generate a notification in response to the first mobile device being located proximal to the second mobile device provided that the first mobile device and the second mobile device are associated with the first group and are located outside of the area corresponding to the first group. The generating unit 160 is in communication with the storage unit 120. The generating unit 160 may read the group information and the location information of the plurality of mobile devices and determine whether to generate a notification for each of the mobile devices based on this group information and location information.

For example, if two mobile devices associated with the first group corresponding to a first area are proximal in an area differing from the first area, then the generating unit 160 determines that a notification for each of the two mobile devices, the notification indicating that a mobile device in the first group is proximal, should be generated and generates these notifications. The generating unit 160 supplies notifications to the notification unit 170. The generating unit 160 may be a circuit, a shared or dedicated computer readable medium storing computer readable program instructions executed by a shared or dedicated processor, etc. In some embodiments, the generating unit 160 may be computer readable instructions stored on the same computer readable medium and executed by the same processor as the registration unit, the grouping unit, the counter unit, the weighting unit, and/or the determining unit.

The notification unit 170 may be operable to deliver the notification to the first mobile device and the second mobile device. The notification unit 170 may deliver the notification according to the settings stored in the storage unit 120. These settings stored in the storage unit 120 may designate a delivery destination, information to be delivered, and the like. For example, a setting associated with a first mobile device may specify a phone number, an email address, a social media account, or any other contact information as the delivery destination. The notification unit 170 may provide a notification to the first mobile device indicating that a mobile device in the first group has been detected near the first mobile device without providing any personal information of the nearby mobile device. In some embodiments, the notification may not specify the group with which the nearby mobile device is associated. The notification unit 170 can be a modem, a LAN interface, a wireless LAN interface, or any other wired or wireless communication interface. In some embodiments, the location acquiring unit, the receiving unit, and the notification unit may be the same unit.

The apparatus 100 may generate and update groups dynamically, according to the locations of the plurality of mobile devices. The apparatus 100 may provide notification that a mobile device in a group has become proximal to another mobile device in that group, in response to those mobile devices becoming proximal in an area outside of the area corresponding to that group.

With the apparatus 100, it is possible to group a mobile device possessed by a user with one or more other mobile devices that are in proximity to the mobile device of the user without requiring registration in advance by the user. Furthermore, the apparatus 100 can dynamically update the group.

For example, in response to a second mobile device, which is not associated with a second group, becoming proximal to a first mobile device in a second area, which corresponds to the second group, a notification may be delivered to both of these mobile devices, thereby deepening the friendship of the users of these mobile devices. In these embodiments, if the frequency with which the second mobile device is located in the second area becomes high, then the count of the number of detections becomes large. In response, a determining unit can include the second mobile device in the second group. Specifically, an apparatus according to some embodiments can automatically and dynamically perform grouping while reflecting the daily activities and lifestyle of the user without performing a detailed analysis of the activities of the owners of mobile devices among the general public. A group may not last perpetually after being formed and may be removed by the grouping unit 150. Mobile devices that belong to a group are not fixed and may be removed from groups by the grouping unit 150 with changes in circumstances.

The apparatus 100 may change setting values or the like according to a request from the user submitted through a mobile device. The first mobile device may transmit a request to the apparatus 100 to change the predetermined threshold used by the determining unit 156. The receiving unit 130 may receive the request from the mobile device and may supply the request to the grouping unit 150. The determining unit 156 may change the predetermined threshold in response to receiving the request from the mobile device. The receiving unit 130 may supply the request from the mobile device to the registration unit 140, and in response, the registration unit 140 may store in the storage unit 120 the received threshold.

The first mobile device may transmit to the apparatus 100 a request to not create a group for an area specified by the user. The receiving unit 130 may receive such a request from the mobile device and may supply the request to the grouping unit 150. The grouping unit 150 may be prohibited from creating a group corresponding to the specified area in response to receiving the request from the first mobile device. The receiving unit 130 may supply the request from the mobile device to the registration unit 140, and in response, the registration unit 140 may store the received request in the storage unit 120 as a setting value.

The apparatus 100 may provide a proximity notification to mobile devices without using personal information of the mobile devices and even without being aware of the personal identity associated with individual mobile devices. In addition, according to registration and settings of each mobile device, mobile devices may be permitted to recognize other mobile devices that have given such permission through instructions or input by the users. In some of these embodiments, if a first mobile device obtains permission from a second mobile device, then personal information corresponding to the user of the second mobile device may be stored in the first mobile device. The first mobile device may store the ID, user name, nickname, and the like of the user of second mobile device in association with the identification information of the second mobile device.

The first mobile device may transmit to the apparatus 100 a request to include identification of the second mobile device in the notification. The receiving unit 130 may receive the request from the mobile device and supply the request to the registration unit 140 in response. The registration unit 140 may be operable to register the second mobile device, which is identified by the first mobile device in the request, in the storage unit 120, in response to receiving the request from the first mobile device. In response to the registration of such a setting, the generating unit 160 may include an identification of a registered mobile device in a generated notification.

The generating unit 160 may include identification information of the second mobile device in response to the request from the first mobile device. If the identification information of the second mobile device is delivered, then the first mobile device may display the personal information of the second mobile device corresponding to the identification information. In this way, the user of the first mobile device can recognize whether the user of the second mobile device is in proximity without the apparatus 100 using personal information.

Figure 2:
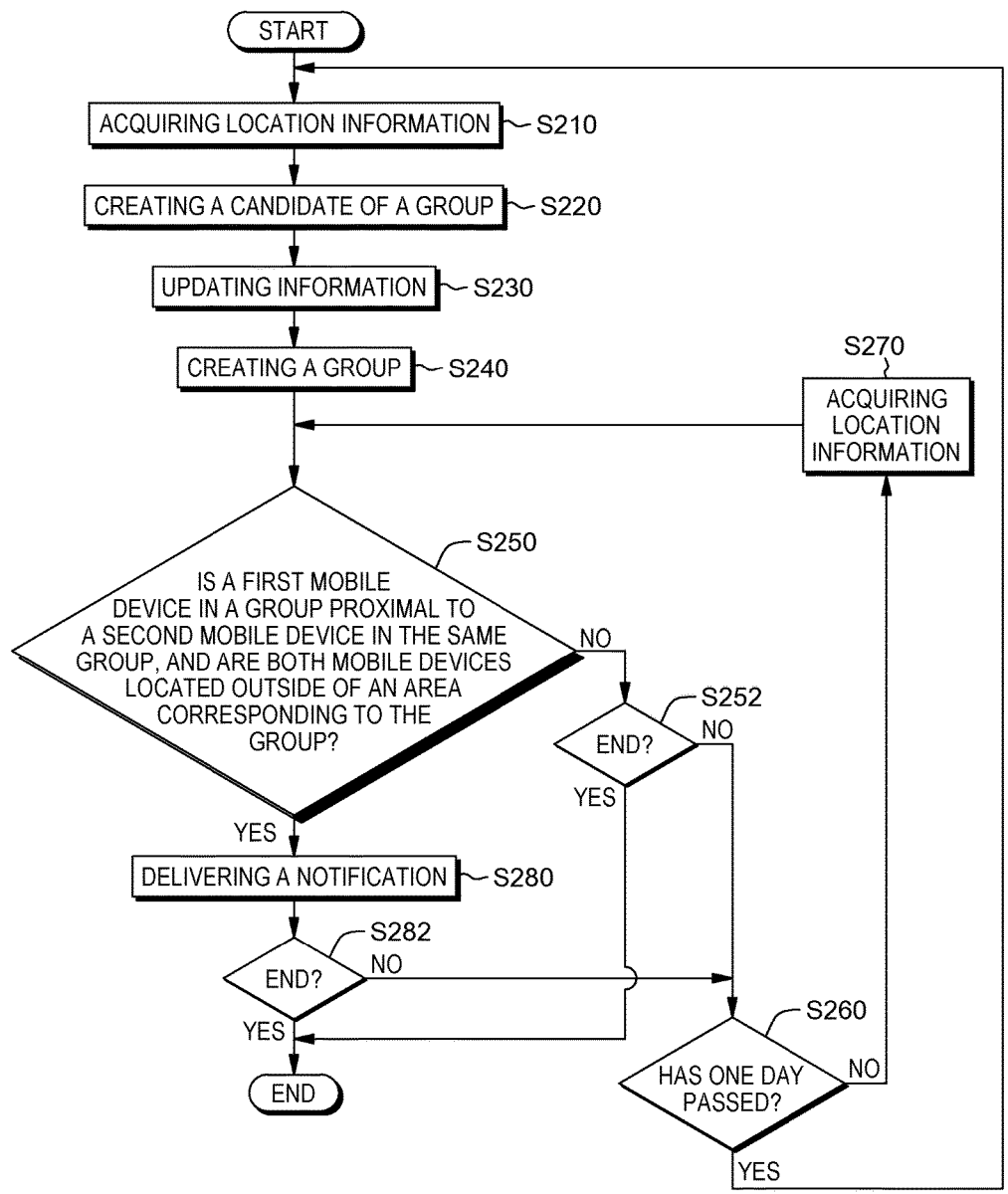
FIG. 2 shows an operational flow performed by an apparatus, according to an embodiment of the present invention.

FIG. 2 shows an operational flow performed by an apparatus, according to an embodiment of the present invention. This embodiment describes an example in which the apparatus is realized in a server and handles information, requests, and notification through communication with a plurality of mobile devices.

A location acquiring unit, such as the location acquiring unit 110 of FIG. 1, may acquire the location information of one or more mobile devices (S210). For example, if a user of a first mobile device among a plurality of mobile devices is working in an office, then the location acquiring unit may acquire the geographical coordinates of the office as the location information of the first mobile device. If a coworker is a user of a second mobile device and is also working in the office, then the location acquiring unit may acquire the same location information of the second mobile device. The location acquiring unit may record the location information as the geographical coordinates of the office, the geographical coordinates of the individual mobile devices, the address of the office, some proprietary indicator specific to the apparatus that designates the office, a geofence outlining the office, etc.

In this way, the location acquiring unit may periodically acquire the location information of each mobile device in an entire network, for example, on the Internet, subscribing to a service provider, subscribing to a proximity service, etc. The location acquiring unit may acquire the location information of each mobile device at synchronized or offset time intervals and may store the acquired location information in a storage unit. For example, the location acquiring unit may store identification information, location information, and the time at which the location information is acquired for each mobile device.

A grouping unit, such as the grouping unit 150 of FIG. 1, may generate group candidates for areas in which a mobile device is located (S220). For example, the grouping unit may define the area as a circle formed with a radius (e.g., 10 meters) centered on the location of the first mobile device at a given detection time. If there is no change in the position of the first mobile device at the next detection time (e.g., if the user of the first mobile device continues working at their desk in the office), or if the location of the first mobile device changes but remains within the defined area (e.g., if the user carries the first mobile device and moves to an adjacent room in the office), then the grouping unit may determine that the first mobile device is located in the same area. In other embodiments, the grouping unit may define the area as a circle formed with a radius centered on an average location of the first mobile device calculated from the detected location throughout an hour, a day, etc. In further embodiments, the grouping unit may define the area as a set of coordinates outlining the office, such as a geofence, or a street address of the office, which may include floor information.

If the location of the first mobile device is outside of the defined area at a subsequent detection time, e.g., if the user leaves the office, then the grouping unit may determine that the first mobile device has moved to a different area. For example, the user may carry the first mobile device throughout the day, traveling from a home to the office, leaving the office to go to lunch at a restaurant, returning to the office, traveling to an office of a customer, going to exercise at a gym, returning home, etc. In this case, the grouping unit may determine that the first mobile device is spending time at areas corresponding respectively to the home, the office, the restaurant, the office, the customer office, the gym, and the home, in the stated order.

For each area where a mobile device is located, a counter unit counts the number of detections of each of the other mobile devices in that area. For example, when the user of the first mobile device is located at home, mobile devices possessed by the family of the user may also be detected in the area corresponding to the home. When the user of the first mobile device is working at the office, a mobile device possessed by a coworker of the user working in this office may be detected in the area corresponding to the office. While the user continues to work at the office, and the coworker also continues to work at the office, the mobile device possessed by the coworker may be detected to be at the office at multiple detection times. The counter unit may count the number of detections of other mobile devices in one area.

If group candidate information or group information is already stored in the storage unit by a counter unit, then the grouping unit may update this information. For example, the grouping unit may search for groups or group candidates having substantially matching identification information and area information, among the past group candidates and groups, and indicates matching groups or group candidates as having corresponding information.

If there is a corresponding group or corresponding group candidate for the group candidate, then the grouping unit may update this corresponding group or corresponding group candidate (S230). The grouping unit may perform this update by adding the number of detections of each mobile device of the group candidate to the number of detections of each mobile device of the corresponding group candidate or corresponding group.

In updating the past number of detections of each mobile device of the corresponding group candidate or corresponding group, the grouping unit may assign weights to the detections in order to reduce the impact of older detections. A weighting unit may assign a weight to the past detections. For example, the weighting unit may perform the update by adding the number of detections of each mobile device of the group candidate to a value obtained as the product of a coefficient that is less than 1 and the past number of detections of each mobile device of the corresponding group candidate or corresponding group. The weighting unit may multiply the number of detections from one day ago by 0.8 and add the number of detections counted by the counter unit for the present day to the multiplication result.

If the number of detections of a mobile device of the corresponding group candidate or corresponding group also includes detections from two days ago, then the detections from two days ago have already been multiplied by 0.8 one day earlier and are, therefore, once again multiplied by 0.8 during the update of the present day, resulting in an ultimate weight of 0.64 being multiplied by the number of detections from two days ago. In the updated number of detections of the present day, the detections from n days ago have had an ultimate weight of 0.8n applied. The weighted numbers of detections of the previous days are added to the number of detections counted by the counter unit for the present day.

In this way, the weighting unit may assign less weight to older information, thereby reducing the impact of the location information for mobile devices detected in the past. The weighting unit may reduce the impact of information for areas where the user of the mobile device has become located more infrequently, which may be due to the user moving homes, changing workplaces, changing preferences, or changing daily habits, for example, and can therefore generate group candidates or groups in accordance with the latest changes in the life of the user.

A determining unit, such as the determining unit 156 of FIG. 1, may compare the sum of the number of detections of each mobile device detected in an area to a predetermined threshold to determine whether to include the detected mobile device in a group corresponding to the area (S240). If the mobile device that is to be included in a group would be the only mobile device in the group (i.e., if no other mobile device exceeds the predetermined threshold number of detections within an area), then the determining unit may maintain a group candidate without actually forming the group. The determining unit may store the group and group candidate information in a storage unit. In this way, each group may be created by acquiring location information of each of the plurality of mobile devices and grouping at least two of the plurality of mobile devices based on proximity by using the location information of each mobile device. In other embodiments, a determining unit may maintain a group candidate without actually forming a group until a mobile device other than the subject mobile device, such as the mobile device on which the area is defined, has a number of detections that exceeds the predetermined threshold.

A generating unit, such as the generating unit 160 of FIG. 1, reads, from a storage unit, group information, and the location information of a plurality of mobile devices. In one embodiment, the generating unit determined whether a first mobile device in a group is proximal to a second mobile device in the same group and determines whether both mobile devices are located outside of an area that corresponds to the group (S250). If a first mobile device and a second mobile device are located in an area associated with a first group, and the mobile devices both belong to the first group, then the generating unit does not generate a notification (S250: No). Even though the second mobile device is proximal to the first mobile device, both mobile devices are currently located within the area associated with the first group. If the first mobile device and a plurality of mobile devices associated with the second group are located in an area associated with a second group, then the generating unit may not generate a notification (S250: No) (e.g., because these mobile devices are currently located within the area associated with the second group).

If the first mobile device is located proximal to the second mobile device, and if the first mobile device and the second mobile device are located in the second area, which corresponds to the second group, and if the second mobile device is not associated with the second group, but only the first group, then the generating unit may generate a notification (S250: Yes). In response, a notification unit, such as notification unit 170 of FIG. 1, may notify the first mobile device that the second mobile device is in proximity (S280).

If the generating unit does not generate the notification (S250: No), and there are no instructions to stop the operation of the apparatus (S252: No), then the generating unit determines whether one day has passed since the creation or most recent update of the group (S260). If one day has not yet passed since the group creation or most recent update (S260: No), then the generating unit reads any newly acquired location information of the plurality of mobile devices from the storage unit (S270), such as any location information acquired in the latest synchronized detections or the latest round of offset detections and determines whether to generate any notifications (S250).

Since updates of the group information may be performed by the grouping unit once per day, the group information is not updated throughout the day, and the generating unit may simply read the newly acquired location information of the plurality of mobile devices from the storage unit. The apparatus may continue monitoring proximity of mobile devices associated with a group in locations different from the area associated with the group, based on the newly acquired location information of the plurality of mobile devices. If one day has passed since the group creation or most recent update (S260: Yes), then the grouping unit may create and update the group and group candidate information, and the generating unit may read the location information from the storage unit (S210) and return to the operation of monitoring proximity of mobile devices and generating notifications. If there is an instruction to stop the operation of the apparatus (S252: Yes), then the apparatus may stop operating.

The notification unit may deliver the notification generated by the generating unit to the first mobile device. The notification unit may deliver this notification to the second mobile device. If there are multiple mobile devices for which the notification of proximity to the first mobile device is to be made, then the notification unit may deliver the notification to all of the mobile devices in addition to the first mobile device. The first mobile device receives multiple notifications of proximity, one for each of the multiple devices in proximity that share a group corresponding to a different area, and each of the multiple devices receives a notification that the first mobile device is in proximity.

If there are no instructions to stop the operation of the apparatus (S282: No), then the generating unit determines whether one day has passed from the group creation or most recent update (S260). If one day has not yet passed since the group creation or most recent update (S260: No), then the generating unit may read the newly acquired location information of the plurality of mobile devices from the storage unit (S270) and determine whether to generate any notifications (S250). If one day has passed since the group update (S260: Yes), then the grouping unit may create and update groups and group candidates, and the generating unit may read the location information from the storage unit (S210) and return to the operation of monitoring proximity of mobile devices and generating notifications. If there is an instruction to stop the operation of the apparatus (S282: Yes), then the apparatus may stop operating.

FIG. 3 shows exemplary location information, according to an embodiment of the present invention. FIG. 3 shows an example in which a location acquiring unit has acquired the location information of the first mobile device every ten minutes and has stored the acquired location information in a storage unit. Here, an example is shown in which the identification (ID) of each mobile device is a character sequence. In some embodiments, the ID may include personal information, such as the user name of the mobile device and the serial number of the mobile device. However, in this embodiment, the location acquiring unit has instead used, as the identification information, a character string obtained by hashing, encrypting, or encoding the ID of the first mobile device. In some embodiments, no user information other than the ID of the mobile device is recorded. In this way, any information that links directly to personal information can be omitted from the information managed in the apparatus.

FIG. 3 shows an example in which the character string "cxresigxg..feg," which is obtained by encoding the ID of the first mobile device, is used in the first column as the identification information. The first row in FIG. 3 shows an example in which a location acquiring unit has recorded that the first mobile device was located at latitude: 35.65858 and longitude: 139.745433 at 9:00 a.m. on Nov. 6, 2014. The second row in FIG. 3 shows an example in which the location acquiring unit has recorded that the first mobile device was located at latitude: 35.65858 and longitude: 139.745433 at 9:10 a.m. on Nov. 6, 2014. The location acquiring unit may acquire the location information of each mobile device, record the location information in the same way, and accumulate the location information of each mobile device in the storage unit.

A grouping unit may generate one or more groups based on the location information of the plurality of mobile devices. The grouping unit may generate the groups based on the location information of the plurality of mobile devices accumulated by the location acquiring unit during a period. The present embodiment describes an example in which the grouping unit generates a group based on the location information of the plurality of mobile devices accumulated by the location acquiring unit over a period of one day. In this case, the grouping unit performs generation and updating of the groups once per day.

The grouping unit may condense a plurality of rows, such as a row of data in FIG. 3, into a single row in response to a determination, derived from the location information, that a mobile device is located in the same area during multiple detections. The grouping unit may condense two rows into a single row if the location of a mobile device, such as "cxresigxg..feg" of FIG. 3, does not change even though the time changes from the first row to the second row. In the case shown in FIG. 3, the row resulting from the condensing by the grouping unit may include the identification information of the mobile device recorded in the first column and the corresponding location information (latitude: 35.65858 and longitude: 139.745433) recorded in the second column. The corresponding location information of the condensed row may be recorded as a location range or area, such as the defined area.

FIG. 4 shows an example of information defining the areas where each mobile device spends time, according to an embodiment of the present invention. FIG. 4 shows defined areas in which each of the mobile devices has been detected, based on the location information, temporally arranged by a grouping unit, such as the grouping unit 150 of FIG. 1. The mobile device "cxresigxg..feg" moved from a first area, defined by longitude: 35.65858 to 35.65860 and latitude: 139.745433 to 139.745435, to a second area, defined by longitude: 35.658809 to 35.658789 and latitude: 139.70988 to 139.74978. The mobile device "rsdfesfei..qvx" moved from a third area, defined by longitude: 35.658704 to 35.658705 and latitude: 139.745408 to 139.745409, to a fourth area, defined by longitude: 35.658788 to 35.658989 and latitude: 139.798237 to 139.745909.

The right-most column in FIG. 4 shows exemplary counting results obtained by the counter unit. Specifically, FIG. 4 shows an example in which, while the mobile device "cxresigxg..feg" is located in the first area, the mobile device "efexfs..cgf" is detected to be in the first area two times, the mobile device "fger..fee" is detected to be in the first area three times, the mobile device "qegfe...get" is detected to be in the first area one time, the mobile device "onbf..plf" is detected to be in the first area five times, and the mobile device "ouitf..at" is detected to be in the first area one time.

Furthermore, while the mobile device "cxresigxg..feg" is located in the second area, the mobile device "gigxg...eaf" is detected to be in the second area three times, the mobile device "tdrs..ete" is detected to be in the second area two times, the mobile device "hzahr..lkj" is detected to be in the second area five times, and the mobile device "qpaf..hjs" is detected to be in the second area one time. In other embodiments, the counter unit may also count detections of other mobile devices even while the mobile device is not in an area. For example, if a mobile device spends a lot of time at an area, the counter unit may determine that the mobile device is associated with other mobile devices that are detected in that area, even if the other mobile devices do not always appear at the same time.

Each row in FIG. 4 may be a candidate for a group to be formed by the grouping unit. The grouping unit may record the information of each group candidate in a storage unit. FIG. 4 shows an example in which each row, which is a group candidate, includes identification information, area information, and counting results of other mobile devices. In other embodiments, each row may further include information concerning the period of time over which each mobile device is located in each area.

FIG. 5 shows exemplary updated groups or group candidates resulting from a weighting unit, such as the weighting unit 154 of FIG. 1, assigning weights to the detections, according to an embodiment of the present invention. FIG. 5 shows an example in which, during the time or times, including past times, that the mobile device "cxresigxg..feg" has been located in the first area, the mobile device "efexfs..cgf" has been detected in the first area 23.67 times, the mobile device "fger..fee" has been detected in the first area 33.52 times, the mobile device "qegfe...get" has been detected in the first area 58.78 times, the mobile device "onbf..plf" has been detected in the first area 5.33 times, and the mobile device "ouitf..at" has been detected in the first area 1.62 times. Fractions of detections are included in the number of detections because the weighting unit has used values less than 1 as weights.

A determining unit, such as the determining unit 156 of FIG. 1, may compare the sum of the number of detections of each mobile device detected in an area to a predetermined threshold to determine whether to include the detected mobile device in a group corresponding to the area. For example, if the predetermined threshold is 20, then the determining unit may generate a group, e.g., a first group, that includes the mobile devices "efexfs..cgf," "fger..fee," and "qegfe..get" in the group of the mobile device "cxresigxg..feg" corresponding to the first area, defined by longitude: 35.65858 to 35.65860 and latitude: 139.745433 to 139.745435. Since the sum of the number of detections for the mobile devices "onbf..plf" and "ouitf..at" are each less than 20, the determining unit may determine not to include these mobile devices in the first group.

Furthermore, the grouping unit may be operable to create a second group for the first mobile device if the first mobile device is detected in a second area. For example, if the predetermined threshold is 20, then the determining unit may generate the second group by including the mobile devices "gigxg..eaf" and "hzahr..lkj" in the group of the mobile device "cxresigxg..feg" corresponding to the second area, defined by longitude: 35.658809 to 35.658789 and latitude: 139.70988 to 139.74978.

Figure 6:
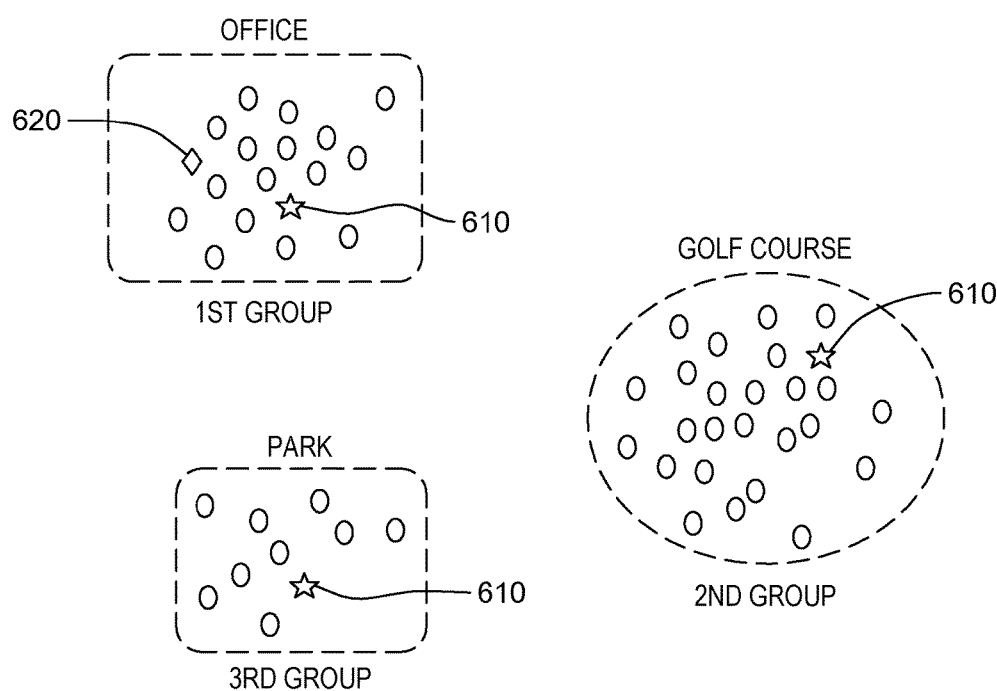
FIG. 6 shows exemplary groups created by a grouping unit, according to an embodiment of the present invention.

FIG. 6 shows exemplary groups created by a grouping unit, such as the grouping unit 150 of FIG. 1, according to an embodiment of the present invention. FIG. 6 shows an example of three groups, wherein each group corresponds to an area where the first mobile device 610 has been detected. The three groups in this example include a first group corresponding to an office, a second group corresponding to a golf course, and a third group corresponding to a park.

The first group may be created by grouping a plurality of mobile devices including the first mobile device 610 and the second mobile device 620. The second group may be created by grouping a plurality of mobile devices including the first mobile device 610. Similarly, the third group may be created by grouping a plurality of mobile devices including the first mobile device 610. The second and third groups do not include the second mobile device 620.

If the first mobile device 610 and the second mobile device 620 are located in an area associated with the first group, then the generating unit does not generate a notification, even though the second mobile device 620 is proximal to the first mobile device 610 because these mobile devices are currently located within the area associated with the first group. There may be no need to provide notification when the user is working in the office along with a coworker as usual. Therefore, the generating unit may not generate a notification when a mobile device associated with a group associated with an area within which the mobile devices are currently located.

If the first mobile device 610 and a plurality of mobile devices associated with the second group are located in the area associated with the second group, then the generating unit does not generate a notification because these mobile devices are currently located within the area associated with the second group. There may be no need to provide notification when the user is playing golf at the golf course with people the user often meets. Therefore, the generating unit may not generate notifications for the first mobile device indicating proximity of the plurality of mobile devices associated with the second group.

If the first mobile device 610 is located proximal to the second mobile device 620, and if the first mobile device 610 and the second mobile device 620 are located in the second area, which corresponds to the second group, then the generating unit may generate a notification because the second mobile device 620 is not associated with the second group, but only the first group, and the second area is outside of the first area. When a coworker from the office who the user does not usually meet at the golf course is coincidentally in proximity to the user at the golf course, it may be necessary to notify the user of the proximity of the coworker. In response, a notification unit may notify the first mobile device 610 that the second mobile device 620 is in proximity.

In this way, the user of the first mobile device 610 may be informed that an acquaintance from the office is nearby at a place outside of the office, thereby giving the user an opportunity to talk to this acquaintance. In the manner described in the present embodiment, when someone who the user meets frequently in the same place, such as the office, is coincidentally nearby at a different place, particularly a place for spending personal time, it can be difficult for the user to recognize this person since they may be wearing different clothes, accessories, glasses, or hats, for example. In such a case, the notification unit may provide notification that an office acquaintance is nearby; and therefore, the user can avoid passing by this acquaintance without noticing them.

Such coincidental meetings can also occur outside of the second area, i.e., the golf course, which corresponds to the second group. For example, the second mobile device 620 is not included in the third group, and a coincidental meeting can occur if the second mobile device 620 is proximal to the first mobile device 610 in the third area, i.e., the park, which corresponds to the third group. Notifications may be delivered to mobile devices even when located in areas corresponding to groups in which neither mobile device has been grouped. Therefore, the generating unit may be further operable to generate the notification if the first mobile device 610 is located within the predetermined distance from the second mobile device 620 when the first mobile device 610 and second mobile device 620 are outside of the first area. If there are multiple mobile devices in proximity to the first mobile device 610 that warrant notification, then the generating unit may generate, for the first mobile device 610, a notification of proximity for each of these mobile devices.

Figure 7:
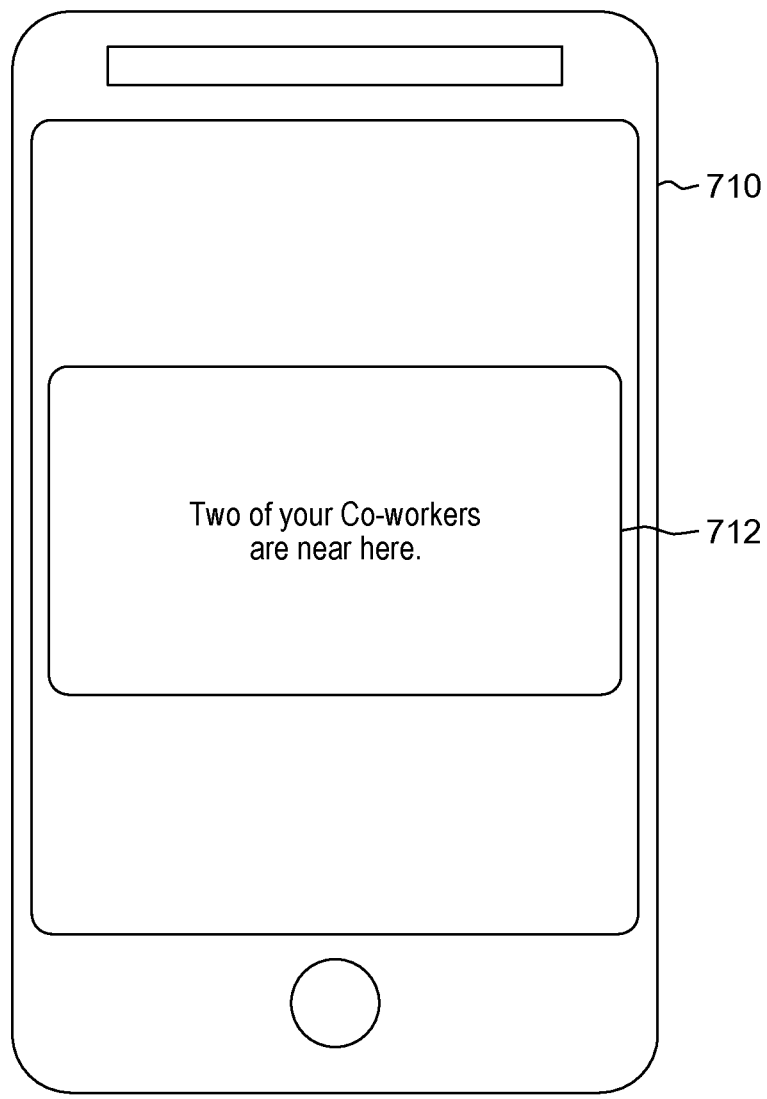
FIG. 7 shows a first example of a notification, according to an embodiment of the present invention.

FIG. 7 shows a first example of a notification 712, according to an embodiment of the present invention. The first mobile device 710 displays the notification 712 delivered to the first mobile device 710 by a notification unit, such as the notification unit 170 of FIG. 1. FIG. 7 shows an example in which the first mobile device 710, a second mobile device, and a third mobile device are associated with a first group of mobile devices, and the first mobile device 710 is located within the predetermined distance from the second mobile device and the third mobile device, but the first, second, and third mobile devices are located outside of the area associated with the first group.

A generating unit, such as the generating unit 160 of FIG. 1, generates a notification 712 indicating the proximity of two mobile devices associated with the first group, and the notification unit delivers the notification 712 to each of the first, second, and third mobile devices. In response to receiving the notification 712, each of the first, second, and third mobile devices may display, "Two of your co-workers are near here." In this way, the apparatus can provide notification indicating the proximity of mobile devices associated with the same group without using the personal information of the users of the mobile devices.

In other embodiments, a notification unit may deliver more detailed area information in a notification. For example, the notification unit may deliver longitude and latitude information of an area, address information obtained by converting longitude and latitude information of an area into an address, and/or map information showing an area. In this way, a mobile device may display, "Two people from the group for Toyosu Canal Front Building, 5-6-52, Toyosu, Koto-ku, Tokyo are near here."

Figure 8:
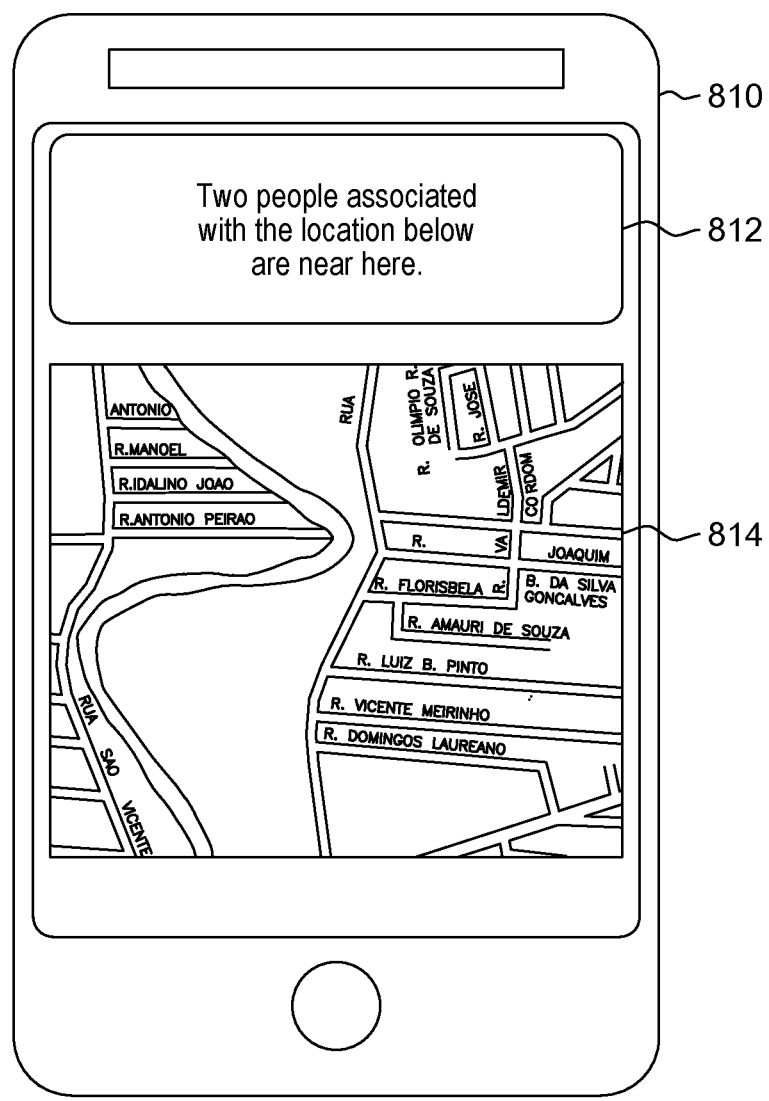
FIG. 8 shows a second example of a notification, according to an embodiment of the present invention.

FIG. 8 shows a second example of a notification 812, according to an embodiment of the present invention. The first mobile device 810 may display information delivered to the first mobile device 810 by a notification unit, such as the notification unit 170 of FIG. 1. FIG. 8 shows an example in which area map information 814 is delivered by the notification unit, received by the first mobile device 810, and displayed on the first mobile device 810. For example, notification 812 indicates, "Two people associated with the location below are near here."

In other embodiments, a grouping unit may perform grouping including information concerning the time period during which each mobile device is located in each area. In these embodiments, a generating unit may generate a notification to include this time information, and a mobile device may display, "Two people who are in company with you from 9:00 a.m. to 6:00 p.m. on weekdays are near here."

Figure 9:
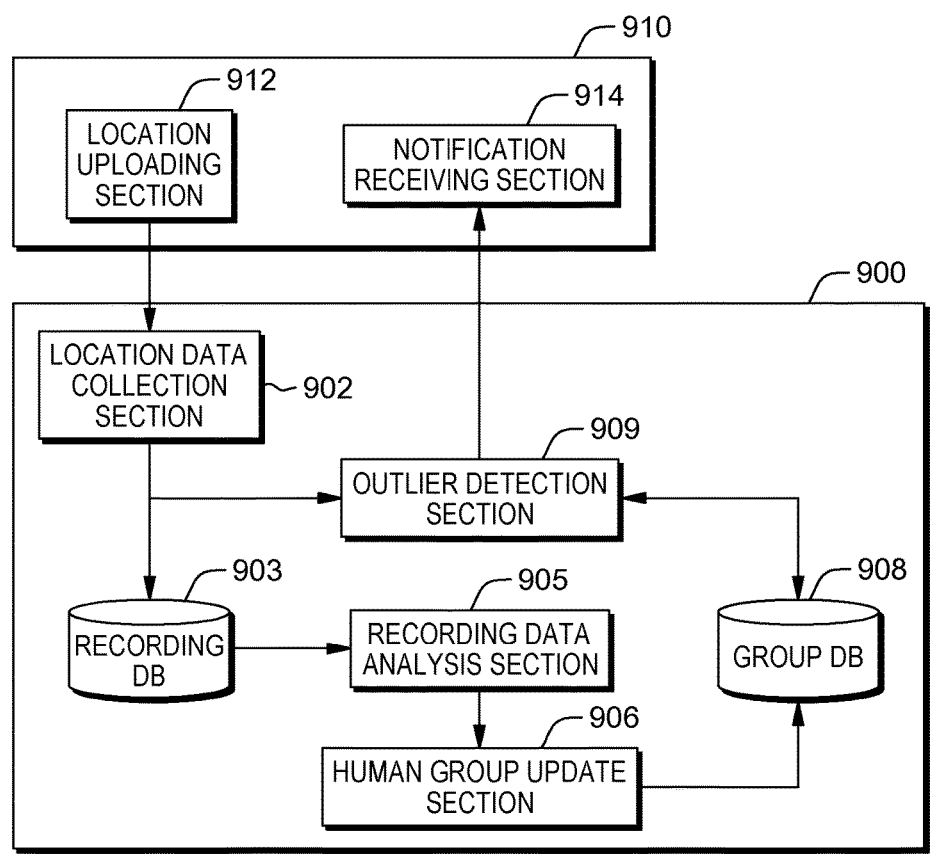
FIG. 9 shows a system for proximity notification, according to an embodiment of the present invention.

FIG. 9 shows a system for proximity notification, according to an embodiment of the present invention. In this embodiment, the system includes an apparatus 900 and a mobile device 910. The apparatus 900 includes a location data collection section 902, a recording database 903, a recording data analysis section 905, a human group update section 906, a group database 908, and an outlier detection section 909. The mobile device 910 includes a location uploading section 912 and a notification receiving section 914.

The location data collection section 902 may be operable to periodically acquire the location information of each mobile device, such as the mobile device 910, in an entire network, on the Internet, subscribing to a service provider, subscribing to a proximity service, etc. Alternatively, a location uploading section, such as location uploading section 912, of each mobile device may upload the location information to the location data collection section 902. The location data collection section 902 may acquire the location information from each mobile device through wireless communication, wired communication, or a combination of wired and wireless communication protocols interconnected in a network, such as the Internet. The location data collection section 902 can be a modem, a LAN interface, a wireless LAN interface, or any other wired or wireless communication interface.

The recording database 903 is in communication with the location data collection section 902 and may be operable to store the acquired location information. The recording database 903 may store a time that the location information was acquired, and identification of the mobile device, along with the location information, such as in the format shown in FIG. 3. The recording database 903 may store setting values of the apparatus 900, intermediate data, calculation results, thresholds, parameters, and the like that are generated or used in the operations performed by the apparatus 900. The recording database 903 may be a computer readable medium, such as an electronic storage device, a magnetic storage device, an optical storage device, an electromagnetic storage device, a semiconductor storage device, etc.

The recording data analysis section 905 may be operable to periodically collect, such as once per day, the periodically acquired location information of mobile devices and may compute the number of detections that each mobile device has appeared within a degree of proximity to a subject mobile device for each area in which the subject mobile device has been located. This recording data analysis section 905 repeats this process for each mobile device as the subject mobile device and generates an aggregate record, such as the record shown in FIG. 4. The recording data analysis section 905 may be a circuit, a shared or dedicated computer readable medium storing computer readable program instructions executed by a shared or dedicated processor, etc.

The human group update section 906 may be operable to create a group by grouping at least two of the mobile devices based on proximity by using the aggregate record. For example, the human group update section 906 may determine whether to create a group or add a mobile device to an existing group by comparing the number of detections to a predetermined threshold. The human group update section 906 may make this determination by comparing a weighted number of detections to the predetermined threshold. If the number of detections exceeds the predetermined threshold, then the human group update section 906 may create a group corresponding to a subject area including at least the mobile device having the exceeding number of detections in that area and the subject mobile device. If a group corresponding to the subject area including the subject mobile device already exists, then the human group update section 906 may add the mobile device having the exceeding number of detections to that group. The human group update section 906 may store new and updated groups in the group database 908. The human group update section 906 may be a circuit, a shared or dedicated computer readable medium storing computer readable program instructions executed by a shared or dedicated processor, etc. In some embodiments, the human group update section may be computer readable instructions stored on the same computer readable medium and executed by the same processor as the recording data analysis section.

The group database 908 may be operable to store new and updated groups created or updated by the human group update section 906. The group database 908 may be accessed by the outlier detection section 909. The group database may be a computer readable medium, such as an electronic storage device, a magnetic storage device, an optical storage device, an electromagnetic storage device, a semiconductor storage device, etc. In some embodiments, the group database may be a shared computer readable medium with the recording database.

The outlier detection section 909 may be operable to generate and deliver a notification to a mobile device in response to determining that another mobile device from a group is located within a predetermined distance from the mobile device at a time when both mobile devices are outside of the area corresponding to the group. The outlier detection section 909 may access the group database 908 and the recording database 903. The outlier detection section 909 may determine for which, if any, mobile devices to generate notifications by comparing the groups of each mobile device with the location information of each mobile device acquired from the location data collection section 902 at each acquiring period. The outlier detection section 909 may be operable to deliver the notifications to the mobile devices. The outlier detection section 909 may be a circuit, a shared or dedicated computer readable medium storing computer readable program instructions executed by a shared or dedicated processor, etc. In some embodiments, the outlier detection section may be computer readable instructions stored on the same computer readable medium and executed by the same processor as the recording data analysis section and/or the human group update section.

The location uploading section 912 may be operable to determine the location of the mobile device 910 and upload location information to the location data collection section 902. The location uploading section 912 may include a Global Positioning System (GPS) chip, a compass, an altimeter, a communication device operable to request and receive information corresponding to the location of mobile device 910, or any other global or relative positioning device. The location uploading section 912 may also include a transmitter or transceiver, such as a cellular transceiver, wireless transceiver, satellite transceiver, etc., operable to communicate with the location data collection section 902.

The notification receiving section 914 may be operable to receive a notification and display the notification for a user of mobile device 910. The notification receiving section 914 may include a receiver or transceiver, such as a cellular transceiver, wireless transceiver, satellite transceiver, etc., operable to receive a notification from the outlier detection section 909. The notification receiving section 914 may also include an electronic display, such as a Liquid Crystal Display (LCD), a Light Emitting Diode (LED) display, etc., operable to produce a visual representation of the notification for a user of the mobile device 910. In some embodiments, the location uploading section and the notification receiving section may share a transceiver.

Figure 10:
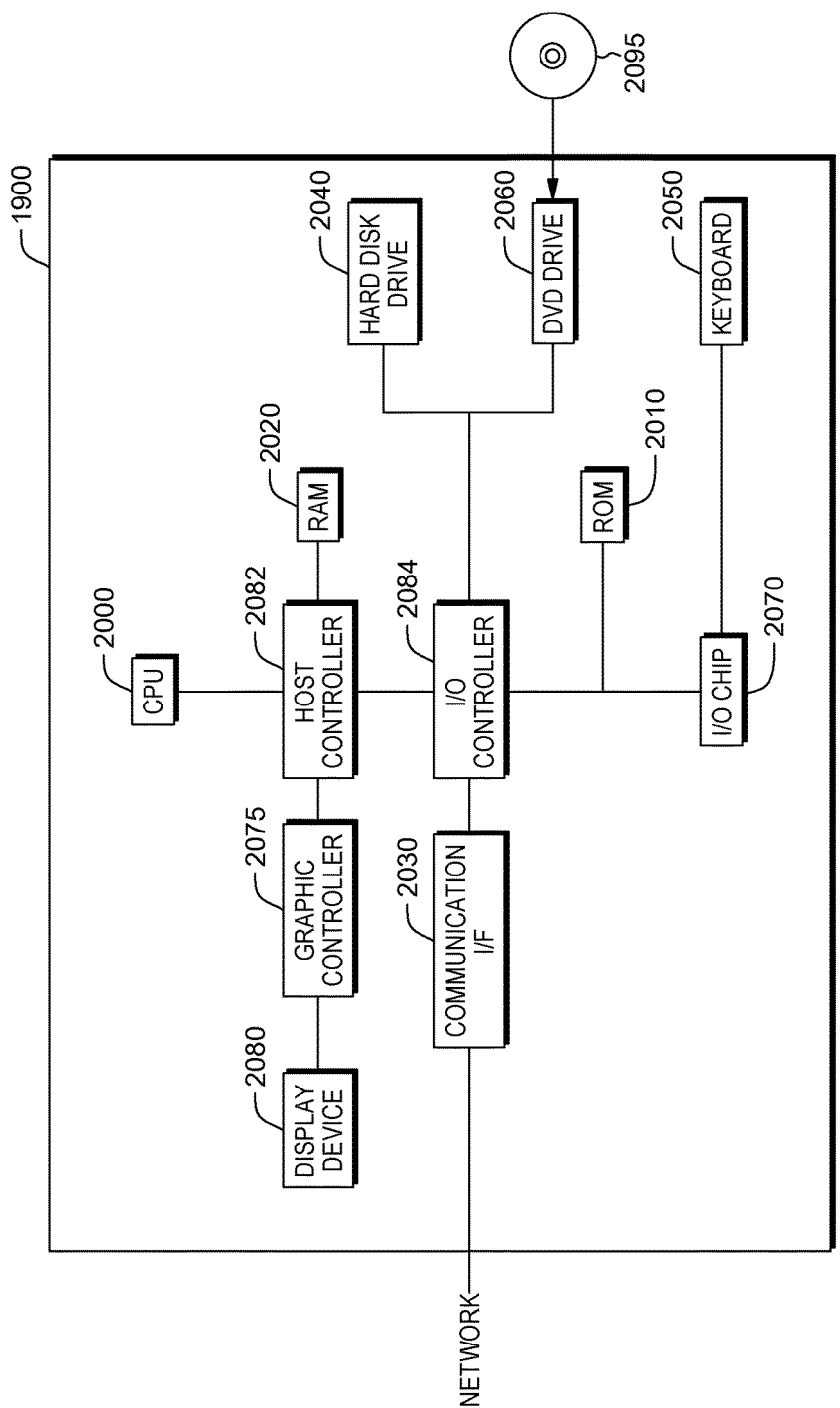
FIG. 10 shows an exemplary configuration of a computer, according to an embodiment of the present invention.

FIG. 10 shows an exemplary configuration of a computer 1900 according to an embodiment of the invention. The computer 1900, according to the present embodiment, includes a CPU 2000, a RAM 2020, a graphic controller 2075, and a display device 2080, which are mutually connected by a host controller 2082. The computer 1900 also includes input/output units, such as a communication interface 2030, a hard disk drive 2040, and a DVD drive 2060, which are connected to the host controller 2082 via an input/output controller 2084. The computer also includes legacy input/output units, such as a ROM 2010 and a keyboard 2050, which are connected to the input/output controller 2084 through an input/output chip 2070.

The host controller 2082 connects the RAM 2020 with the CPU 2000 and the graphic controller 2075 which access the RAM 2020 at a high transfer rate. The CPU 2000 operates according to programs stored in the ROM 2010 and the RAM 2020, thereby controlling each unit. The graphic controller 2075 obtains image data generated by the CPU 2000 on a frame buffer or the like provided in the RAM 2020 and causes the image data to be displayed on the display device 2080. Alternatively, the graphic controller 2075 may contain therein a frame buffer or the like for storing image data generated by the CPU 2000.

The input/output controller 2084 connects the host controller 2082 with the communication interface 2030, the hard disk drive 2040, and the DVD drive 2060, which are relatively high-speed input/output units. The communication interface 2030 communicates with other electronic devices via a network. The hard disk drive 2040 stores programs and data used by the CPU 2000 within the computer 1900. The DVD drive 2060 reads the programs or the data from the DVD 2095 and provides the hard disk drive 2040 with the programs or the data via the RAM 2020.

The ROM 2010, the keyboard 2050, and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user and may provide the hard disk drive 2040 with the text data or the commands via the RAM 2020. The input/output chip 2070 connects a keyboard 2050 to an input/output controller 2084 and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD 2095 and an IC card. The program is read from the recording medium, installed into the hard disk drive 2040 within the computer 1900 via the RAM 2020 and executed in the CPU 2000.

A program that is installed in the computer 1900 and causes the computer 1900 to function as an apparatus, such as apparatus 100 of FIG. 1, includes a location acquiring module, a storage module, a receiving module, a registration module, a grouping module, a generation module, and a notification module. The program or module acts on the CPU 2000 to cause the computer 1900 to function as a location acquiring unit, such as location acquiring unit 110, a storage unit, such as storage unit 120, a receiving unit, such as receiving unit 130, a registration unit, such as registration unit 140, a grouping unit, such as grouping unit 150, a generation unit, such as generating unit 160, and a notification unit, such as notification unit 170.

The information processing described in these programs is read into the computer 1900 to function as a location acquiring unit, a storage unit, a receiving unit, a registration unit, a grouping unit, a generation unit, and a notification unit, which are the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD 2095, and transmits the read transmission data to a network or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020, such as by DMA transfer, the file or the database having been stored in an external recording medium, such as the hard disk drive 2040, the DVD drive 2060 (DVD 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated from among the plurality of entries stored in the recording medium and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD 2095, as well as an optical recording medium, such as a Blu-ray Disk or a CD, a magneto-optic recording medium, such as a MO, a tape medium, and a semiconductor memory, such as an IC card. In addition, a recording medium, such as a hard disk or a RAM provided in a server system connected to a dedicated communication network or the Internet can be used as a recording medium, thereby providing the program to the computer 1900 via the network.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for mobile computing device proximity notification, the method comprising:

acquiring, by one or more processors, location information for a plurality of mobile computing devices;

creating, by one or more processors, a first group of mobile computing devices based on location proximity in the acquired location information of the plurality of mobile computing devices, wherein the created first group includes a first mobile computing device and a second mobile computing device;

determining, by one or more processors, whether the first mobile computing device is within a predetermined distance to the second mobile computing device, and the first mobile computing device and the second mobile computing device are outside of an area associated with the first group;

counting, by one or more processors, a number of detections of a third mobile computing device within the area associated with the first group; and determining, by one or more processors, whether to add the third mobile computing device to the first group based on comparing the number of detections of the third mobile computing device to a predetermined threshold.

2. The method of claim 1, further comprising:

responsive to determining that the first mobile computing device is within a predetermined distance to the second mobile computing device, and that the first mobile computing device and the second mobile computing device are outside of an area associated with the first group, generating, by one or more processors, a notification for the first mobile computing device and the second mobile computing device; and delivering, by one or more processors, the generated notification to the first mobile computing device and the second mobile computing device.

3. The method of claim 1, wherein acquiring location information for the plurality of mobile computing devices comprises:

periodically acquiring, by one or more processors, location information for each mobile computing device within the plurality of mobile computing devices.

4. The method of claim 1, wherein creating the first group of mobile computing devices based on location proximity in the acquired location information of the plurality of mobile computing devices further comprises:

identifying, by one or more processors, candidate mobile computing devices that are within a defined proximity to the first mobile computing device; and creating, by one or more processors, the first group of mobile computing devices, wherein the first group includes one or more of the identified candidate mobile computing devices.

5. The method of claim 4, wherein identifying candidate mobile computing devices that are within the defined proximity to the first mobile computing device further comprises:

monitoring, by one or more processors, a number of detections of mobile computing devices within the defined proximity to the first mobile computing device within a time period that the first mobile computing device is present within an area.

6. The method of claim 1, wherein the plurality of mobile computing devices are a plurality of smartphones.

* * * * *